(12) United States Patent
Seo et al.

(10) Patent No.: US 10,506,146 B2
(45) Date of Patent: Dec. 10, 2019

(54) CAMERA MODULE

(71) Applicant: Samsung Electro-Mechanics Co., Ltd., Suwon-si (KR)

(72) Inventors: Sang Ho Seo, Suwon-si (KR); Kum Kyung Lee, Suwon-si (KR); Sung Taek Oh, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/031,164

(22) Filed: Jul. 10, 2018

(65) Prior Publication Data

US 2019/0058817 A1    Feb. 21, 2019

(30) Foreign Application Priority Data

Aug. 18, 2017  (KR) .................. 10-2017-0105096
Nov. 7, 2017   (KR) .................. 10-2017-0147444

(51) Int. Cl.
*H04N 5/225*     (2006.01)
*G03B 9/06*      (2006.01)
*H04N 5/238*     (2006.01)

(52) U.S. Cl.
CPC ............ *H04N 5/2254* (2013.01); *G03B 9/06* (2013.01); *H04N 5/2252* (2013.01); *H04N 5/2257* (2013.01); *H04N 5/2253* (2013.01); *H04N 5/238* (2013.01)

(58) Field of Classification Search
CPC .. H04N 5/2251; H04N 5/2252; H04N 5/2254; H04N 5/2257; H04N 5/238; G03B 9/06
See application file for complete search history.

(56) References Cited

U.S. PATENT DOCUMENTS

| | | | | |
|---|---|---|---|---|
| 9,794,459 B1* | 10/2017 | Kim | ............... | G02B 5/208 |
| 9,807,312 B1* | 10/2017 | Kim | ............... | H04N 5/238 |
| 10,237,458 B2* | 3/2019 | Lim | ............... | G02B 7/09 |
| 2005/0058444 A1 | 3/2005 | Watanabe et al. | | |
| 2006/0244859 A1* | 11/2006 | Ji | ............... | H04N 5/2253 348/335 |
| 2011/0122311 A1* | 5/2011 | Han | ............... | G03B 9/14 348/362 |
| 2017/0075193 A1* | 3/2017 | Masuzawa | ............... | H04N 5/2257 |

(Continued)

FOREIGN PATENT DOCUMENTS

| | | |
|---|---|---|
| JP | 4317411 B2 | 8/2009 |
| KR | 10-0736486 B1 | 7/2007 |

(Continued)

*Primary Examiner* — Daniel M Pasiewicz

(74) *Attorney, Agent, or Firm* — NSIP Law

(57) ABSTRACT

A camera module includes: a housing accommodating a lens module; a stop module coupled to a top of the lens module, and including a base including a protrusion fixed to the top of the lens module and extending in a direction of an optical axis of the camera module along an outer side of the lens module, plates disposed on the base and having incident holes configured to change an amount of light incident to the lens module, and a magnet portion movable in a direction perpendicular to the direction of the optical axis with respect to the protrusion and including a driving magnet; and a coil disposed in the housing and configured to interact with the driving magnet to drive the stop module.

20 Claims, 14 Drawing Sheets

(56) References Cited

U.S. PATENT DOCUMENTS

| | | | |
|---|---|---|---|
| 2017/0324892 A1 | 11/2017 | Kim et al. | |
| 2018/0164537 A1* | 6/2018 | Lee | H04N 5/2254 |
| 2018/0213137 A1* | 7/2018 | Park | H04N 5/238 |
| 2018/0284571 A1* | 10/2018 | Park | G03B 9/02 |
| 2018/0343370 A1* | 11/2018 | Park | H04N 5/2254 |
| 2019/0049692 A1* | 2/2019 | Choi | G02B 7/09 |
| 2019/0137844 A1* | 5/2019 | Park | G03B 9/06 |
| 2019/0141219 A1* | 5/2019 | Oh | H04N 5/2252 |

FOREIGN PATENT DOCUMENTS

| | | |
|---|---|---|
| KR | 10-2009-0012497 A | 2/2009 |
| KR | 10-2014-0107903 A | 9/2014 |
| KR | 10-1651115 B1 | 9/2016 |
| KR | 10-1659395 B1 | 9/2016 |
| KR | 10-1700771 B1 | 1/2017 |

* cited by examiner

CAMERA MODULE

CROSS-REFERENCE TO RELATED APPLICATIONS

This application claims benefit under 35 U.S.C. § 119(a) of Korean Patent Application Nos. 10-2017-0105096 and 10-2017-0147444 filed on Aug. 18, 2017 and Nov. 7, 2017, respectively, in the Korean Intellectual Property Office, the entire disclosures of which are incorporated herein by reference for all purposes.

BACKGROUND

1. Field

The following description relates to a camera module.

2. Description of Related Art

Recently, camera modules have been standardly installed in portable electronic devices such as tablet personal computers (PCs), notebook PCs, and the like, as well as in smartphones. A digital camera generally includes a mechanical stop to change an amount of incident light therein, depending on an image capturing environment. However, due to structural characteristics and spatial limitations, it is difficult to separately include a mechanical stop in a camera module used in a small product such as a portable electronic device.

As an example, a weight of the camera module is increased due to several components for driving the stop, such that an autofocusing function may be deteriorated. In addition, when the stop itself includes a power supply connecting part such as a coil or the like for driving the stop, a problem may occur in that the power supply connecting part may be caught by upward and downward movement of a lens during autofocusing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a housing accommodating a lens module; a stop module coupled to a top of the lens module and including a base including a protrusion fixed to the top of the lens module and extending in a direction of an optical axis of the camera module along an outer side of the lens module, plates disposed on the base and having incident holes configured to change an amount of light incident to the lens module, and a magnet portion movable in a direction perpendicular to the direction of the optical axis with respect to the protrusion and including a driving magnet; and a coil disposed in the housing and configured to interact with the driving magnet to drive the stop module.

The lens module may include a yoke disposed on a surface facing the magnet portion, and the magnet portion may be supported to be in contact with the protrusion by attractive force between the driving magnet and the yoke.

The yoke may include two yoke portions spaced apart from each other along a movement direction of the magnet portion.

The yoke may have a width that is greater than a width of the magnet in the direction of the optical axis, and a width of end portions of the yoke may be greater than a width of a middle portion of the yoke.

The yoke may have a hole formed in the middle portion.

The yoke may include hinged parts that are bent in a direction toward the magnet and face surfaces of end portions of the magnet.

The protrusion may include a rod member extending in the direction perpendicular to the direction of the optical axis, and the magnet portion may further include an insertion groove into which the rod member is inserted.

A lower end portion of the magnet portion may include a guide boss extending toward the protrusion. A guide plate may be disposed on a lower end portion of the protrusion and may be configured to enable the guide boss to slide.

The base may further include a first protrusion protruding in the direction of the optical axis, and the plates may include first guide holes into which the first protrusion is inserted so that the plates are rotatable about the first protrusion as an axis.

The magnet portion may further include a second protrusion extending in the direction of the optical axis. The plates may further include second guide holes having a hole shape elongated in one direction, and the second protrusion may be inserted into the second guide holes.

The second guide holes may be inclined with respect to a movement direction of the driving part.

The plates may include two plates, and the second guide holes may include two second guide holes respectively disposed in the two plates and inclined with respect to each other.

The camera module may further include a carrier accommodating the lens module so that the lens module is movable in a first direction perpendicular to the direction of the optical axis, the direction of the optical axis, and a second direction perpendicular to the first direction. The carrier may be accommodated in the housing and may be movable in the direction of the optical axis.

The housing may have an approximately square box shape. Two driving coils configured to provide a driving force to move the lens module in the first direction and the second direction may be disposed on first and second surfaces of the housing that extend parallel to the direction of the optical axis. A driving coil configured to provide a driving force to move the carrier in the direction of the optical axis may be disposed on a third surface of the housing that extends parallel to the direction of the optical axis. A coil configured to drive the plates may be disposed on a fourth surface of the housing that extends parallel to the direction of the optical axis.

The driving magnet and the coil may face each other in another direction perpendicular to the direction of the optical axis.

The base may further include a yoke disposed on a surface facing the magnet portion, and the magnet portion may be supported in contact with the protrusion by attractive force between the driving magnet and the yoke.

In another general aspect, a camera module includes: a housing accommodating a lens module; a stop module coupled to a top of the lens module and including a base, a protrusion attached to the base, plates disposed on the base and having incident holes configured to control an amount of light incident to the lens module, and a magnet portion supported by the protrusion and configured to move in a direction perpendicular to a direction of an optical axis of the camera module in order to move the plates to arrange the incident holes; and a coil disposed in the housing and configured to interact with the magnet portion to move the magnet portion in the direction perpendicular to the direction of the optical axis.

The lens module may include a yoke, and the magnet portion may be supported in contact with the protrusion by attractive force between the magnet portion and the yoke.

The plates may include first guide holes and second guide holes. The base may include a first post received in the first guide holes. The magnet portion may include a second post received in the second guide holes. Movement of the magnet portion in the direction perpendicular to the direction of the optical axis may cause the second post to move within the second guide holes and may cause the plates to rotate about the first post.

The protrusion may include a rod member extending in the direction perpendicular to the direction of the optical axis, and the magnet portion may be configured to slide along the rod member.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
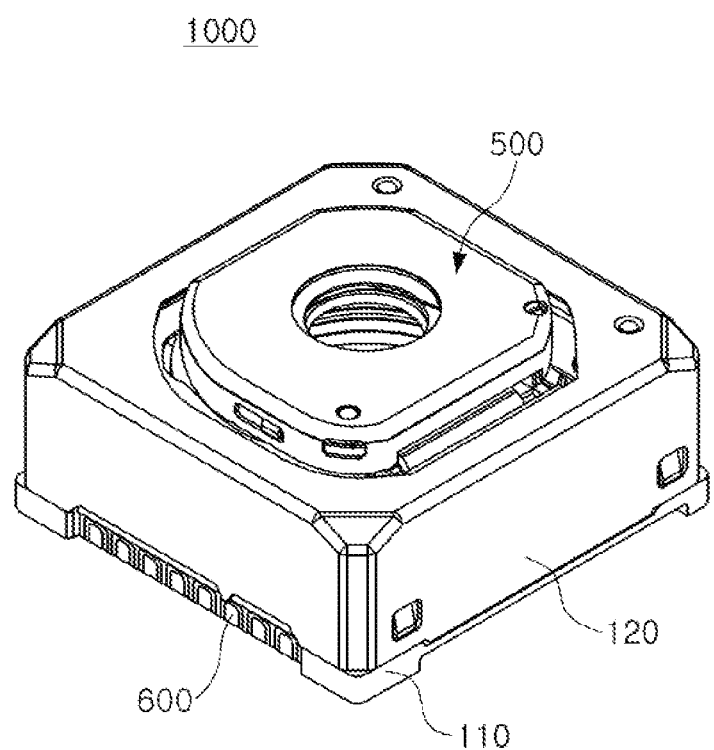
FIG. 1 is a perspective view illustrating a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

The features of the examples described herein may be combined in various ways as will be apparent after an understanding of the disclosure of this application. Further, although the examples described herein have a variety of configurations, other configurations are possible as will be apparent after an understanding of the disclosure of this application.

A camera module according to embodiments disclosed herein may be mounted in a portable electronic device such as a mobile communications terminal, a smartphone, a tablet personal computer (PC), or the like.

Figure 2:
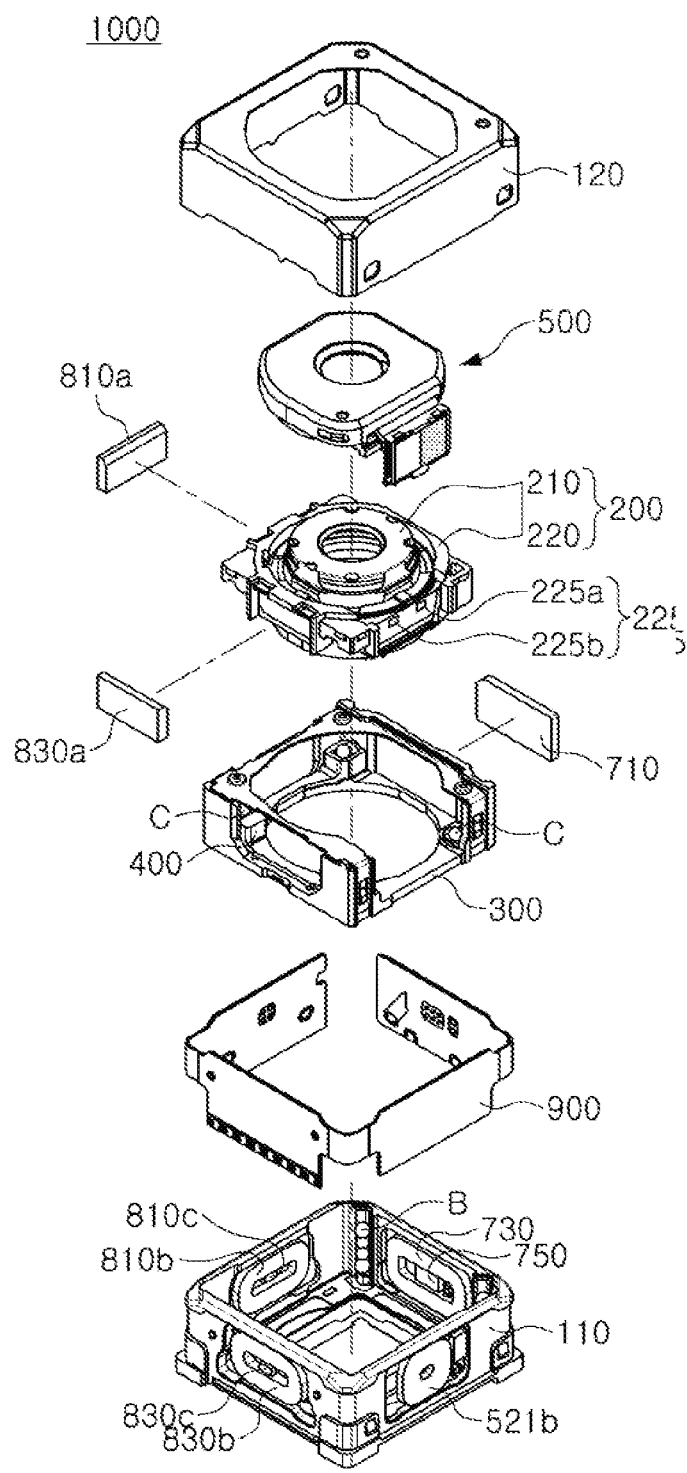
FIG. 2 is an exploded perspective view illustrating the camera module of FIG. 1.
Figure 3A:
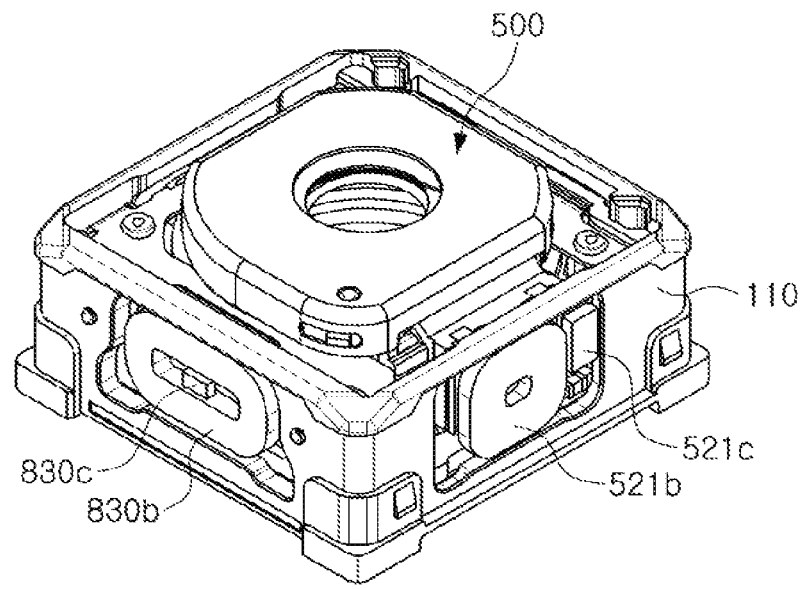
FIG. 3A is a perspective view of the camera module of FIG. 1.
Figure 3B:
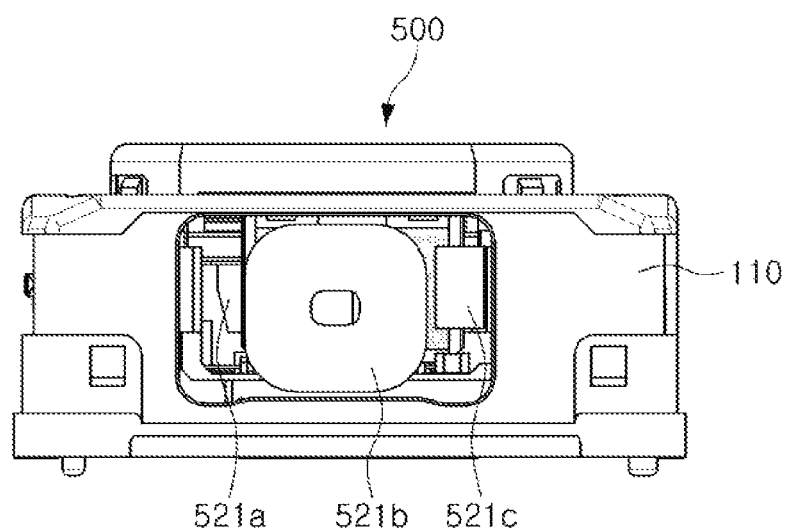
FIG. 3B is a side view of FIG. 3A.

FIG. 1 is a perspective view illustrating a camera module 1000, according to an embodiment. FIG. 2 is an exploded perspective view illustrating the camera module 1000. In addition, FIG. 3A is a perspective view of the camera module 1000 and FIG. 3B is a side view of FIG. 3A.

Referring to FIGS. 1 through 3B, the camera module 1000 may include a lens module 200, a carrier 300, a guide part 400, a stop module 500, a housing 110, and a case 120.

The lens module 200 may include a lens barrel 210 including lenses configured to capture an image of a subject and a holder 220 accommodating the lens barrel 210. The lenses may be disposed in the lens barrel 210 along an optical axis. The lens module 200 may be accommodated in the carrier 300.

The lens module 200 may be movable in a direction of the optical axis to adjust a focus. As an example, the lens module 200 may be moved in the direction of the optical axis together with the carrier 300 by a focus adjustment part.

The focus adjustment part may include a magnet 710 and a coil 730 that generate driving force in the direction of the optical axis. Further, the focus adjustment part may include a position sensor 750, for example, a hall sensor to sense a position of the lens module 200, more specifically, the carrier 300, in the direction of the optical axis.

The magnet 710 may be mounted on the carrier 300. As an example, the magnet 710 may be mounted on one surface of the carrier 300.

The coil 730 and the position sensor 750 may be mounted on the housing 110. As an example, the coil 730 and the position sensor 750 may be fixed to the housing 110 so as to face the magnet 710. The coil 730 and the position sensor 750 disposed on a substrate 900, and the substrate 900 may be mounted on the housing 110.

The magnet 710 may be a movable member that is mounted on the carrier 300 and is configured to be moved in the direction of the optical axis together with the carrier 300. The coil 730 and the position sensor 750 may be fixed members that are fixed to the housing 110.

When power is applied to the coil 730, the carrier 300 may be moved in the direction of the optical axis by electromagnetic interaction between the magnet 710 and the coil 730. In addition, the position sensor 750 may sense a position of the carrier 300 in the direction of the optical axis.

Since the lens module 200 is accommodated in the carrier 300, the lens module 200 may also be moved together with the carrier 220 in the direction of the optical axis by movement of the carrier 300.

A rolling member B may be disposed between the carrier 300 and the housing 110 to reduce friction between the carrier 300 and the housing 110 when the carrier 300 is moved. The rolling member B may have a ball form.

One or more rolling members B may be disposed on both sides of the magnet 710 (or the coil 730).

The substrate 900 may be mounted with a yoke. As an example, the yoke may be disposed to face the magnet 710 with having the coil 730 interposed therebetween.

Attractive force may act in a direction, perpendicular to the direction of the optical axis between the yoke and the magnet 710.

Therefore, the rolling members B may be maintained in a state in which they are in contact with the carrier 300 and the housing 110 by the attractive force between the yoke and the magnet 710.

In addition, the yoke may also focus magnetic force of the magnet 710. Therefore, the yoke may prevent magnetic flux leakage from occurring.

As an example, the yoke and the magnet 710 may form a magnetic circuit.

Meanwhile, in order to correct shaking of an image due to factors such as a hand-shake of a user, and the like, the lens module 200 may be moved in a first direction, perpendicular to the optical axis, and a second direction, perpendicular to the optical axis and the first direction.

For example, when shaking is generated at the time of capturing the image due to the hand-shake of the user, or the like, a shake correction part may compensate for shaking by giving a relative displacement corresponding to shaking to the lens module 200.

The carrier 300 may accommodate the guide part 400 so that the guide part 400 is disposed upwardly in the direction of the optical axis. In addition, the holder 220 may be disposed on the guide part 400. In addition, a ball member C serving as a rolling bearing may be provided between a surface of the carrier 300 extending in the directions of the optical axis and the guide part 400, and between the a surface of the guide part 400 the extending in the directions of the optical axis and the holder 220.

When the lens module 200 is moved in the first direction and the second direction which are perpendicular to the optical axis, the guide part 400 may guide the lens module 200.

As an example, the lens module 200 may be moved in the first direction relative to the guide part 400, and the guide part 400 and the lens module 200 may be moved together in the second direction within the carrier 300.

The shake correction part may include magnets 810a and 830a and coils 810a and 830b for generating driving force for shaking correction. In addition, the shake correction part may include position sensors 810c and 830c, for example, hall sensors, to sense positions of the lens module 200 in the first direction and the second direction.

Among the magnets 810a and 830a and the coils 810b and 830b, one magnet 810a and one coil 810b may be disposed to face each other in the first direction to generate driving force in the first direction, and the other magnet 830a and the other coil 830b may be disposed to face each other in the second direction to generate the driving force in the second direction.

The magnets 810a and 830a may be mounted on the lens module 200, and the coils 810b and 830b facing the magnets 810a and 830a and the position sensors 810c and 830c may be fixed to the housing 110. As an example, the coils 810b and 830b and the position sensors 810c and 830c may be disposed on the substrate 900, and the substrate 900 may be mounted on the housing 110.

The magnets 810a and 830a may be movable members that are configured to be moved together with the lens module 200 in the first direction and the second direction, and the coils 810b and 830b and the position sensors 810c and 830c may be fixed members that are fixed to the housing 110.

As described above, the ball member C may be provided to support the guide part 400 and the lens module 200. The ball member C may guide the guide part 400 and the lens module 200 during the shake correction.

The ball members C may be provided between the carrier 300 and the guide part 400, between the carrier 300 and the lens module 200, and between the guide part 400 and the lens module 200.

In the case in which the driving force is generated in the first direction, the ball members C disposed between the carrier 300 and the guide part 400, and between the carrier 300 and the lens module 200 may roll in the first direction. Accordingly, the ball members C may guide the movement of the guide part 400 and the lens module 200 in the first direction.

In addition, in the case in which the driving force is generated in the second direction, the ball members C disposed between the guide part 400 and the lens module 200, and between the carrier 300 and the lens module 200 may roll in the second direction. Accordingly, the ball members C may guide the movement of the lens module 200 in the second direction.

The lens module 200 and the carrier 300 may be accommodated in the housing 110. As an example, the housing 110 may have a shape of which the top and the bottom are open, and the lens module 200 and the carrier 300 may be accommodated in an internal space of the housing 110.

A printed circuit board on which an image sensor is mounted may be disposed on the bottom of the housing 110.

The case 120 may be coupled to the housing 110 to surround outer surfaces of the housing 110, and may protect internal components of the camera module. In addition, the case 120 may shield electromagnetic waves.

As an example, the case 120 may shield electromagnetic waves generated from the camera module 1000 so that the electromagnetic waves do not have an influence on other electronic components in the portable electronic device.

In addition, since several electronic components as well as the camera module 1000 are mounted in the portable electronic device, the case 120 may shield electromagnetic waves generated from these electronic components so that the electromagnetic waves do not have an influence on the camera module 1000.

The case 120 may be formed of a metal material and be thus grounded to a ground pad provided on the printed circuit board 600 (FIG. 1), thereby shielding the electromagnetic waves.

The stop module 500 may be a device for selectively changing an amount of light incident to the lens module 200.

As an example, the stop module 500 may include incident holes having different sizes. Depending on an environment, in which an image is captured, light may be incident through any one of the incident holes.

Figure 4:
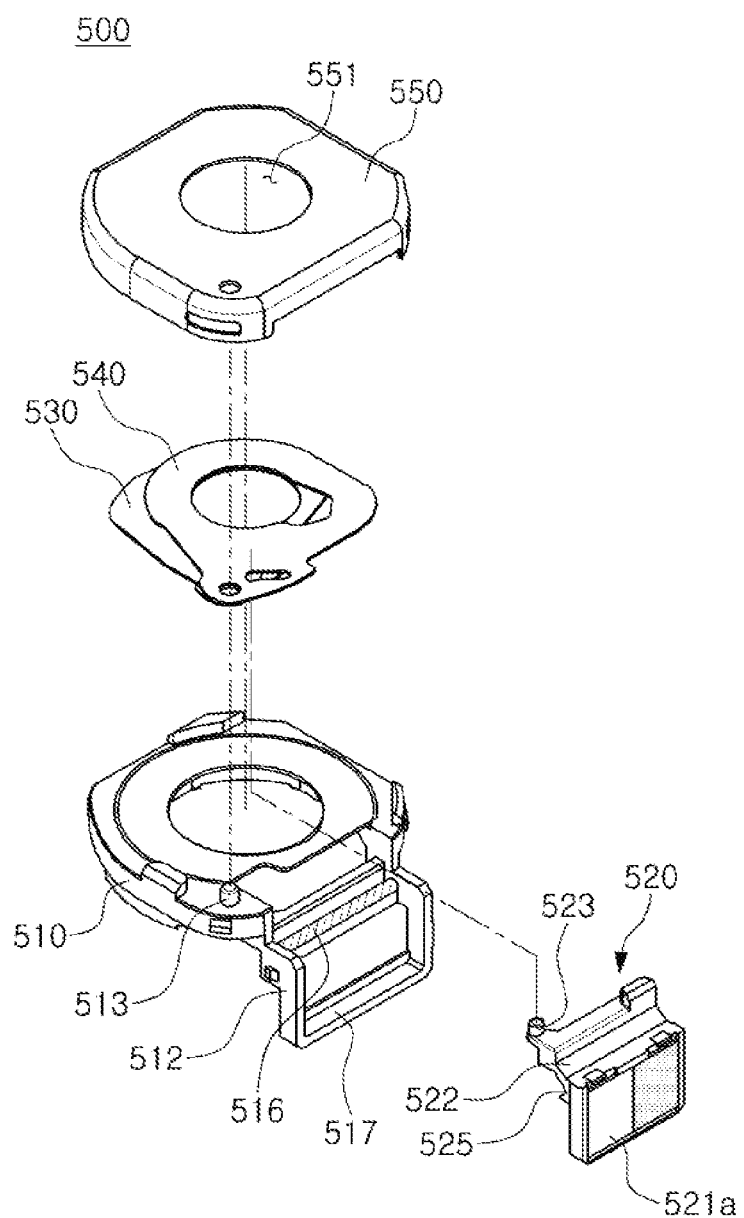
FIG. 4 is an exploded perspective view illustrating a stop module, according to an embodiment.
Figure 5:
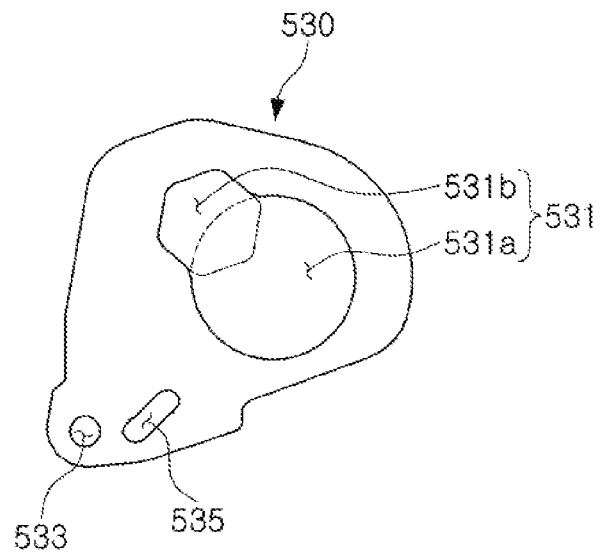
FIG. 5 is a plan view illustrating a first plate included in the stop module, according to an embodiment.
Figure 6:
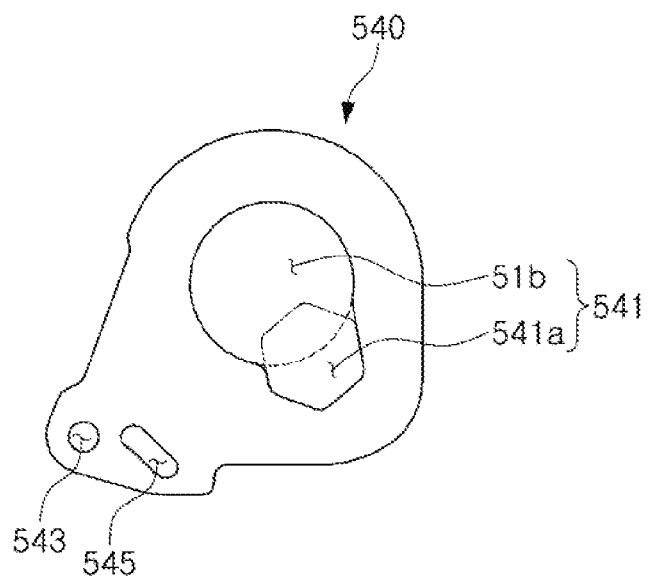
FIG. 6 is a plan view illustrating a second plate included in the stop module, according to an embodiment.
Figure 7A:
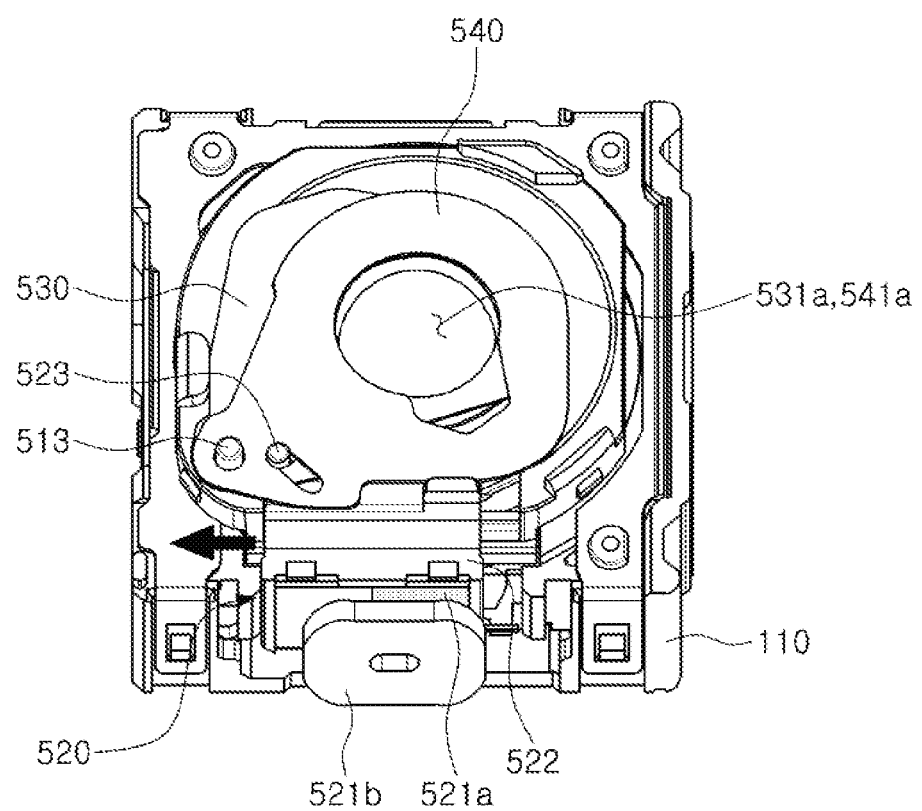
FIGS. 7A and 7B are plan views illustrating shapes in which the stop module is driven to change a diameter of an incident hole, according to an embodiment.
Figure 7B:
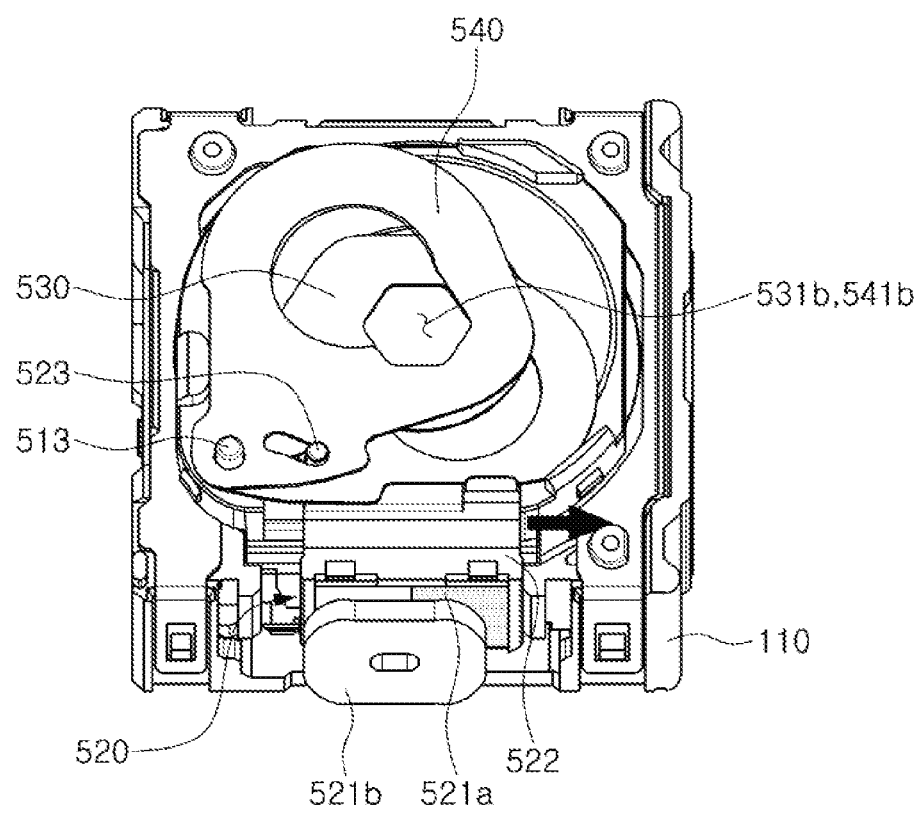
Figure 8:
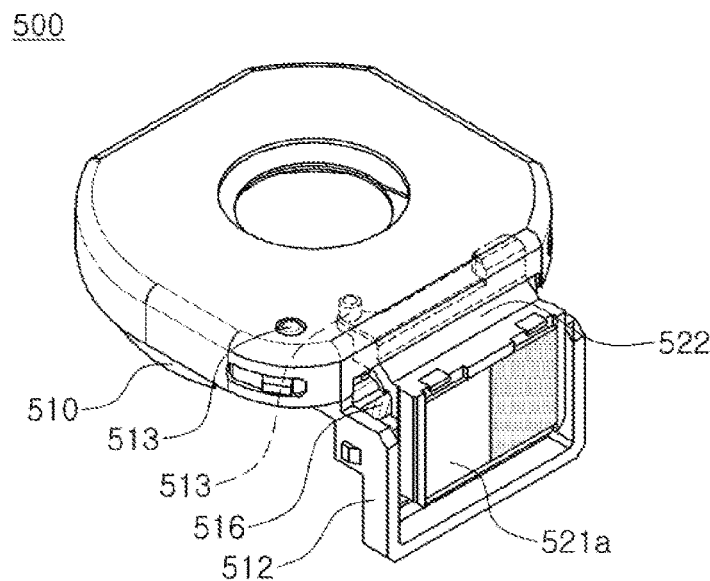
FIG. 8 is a perspective view illustrating the stop module, according to an embodiment.
Figure 9:
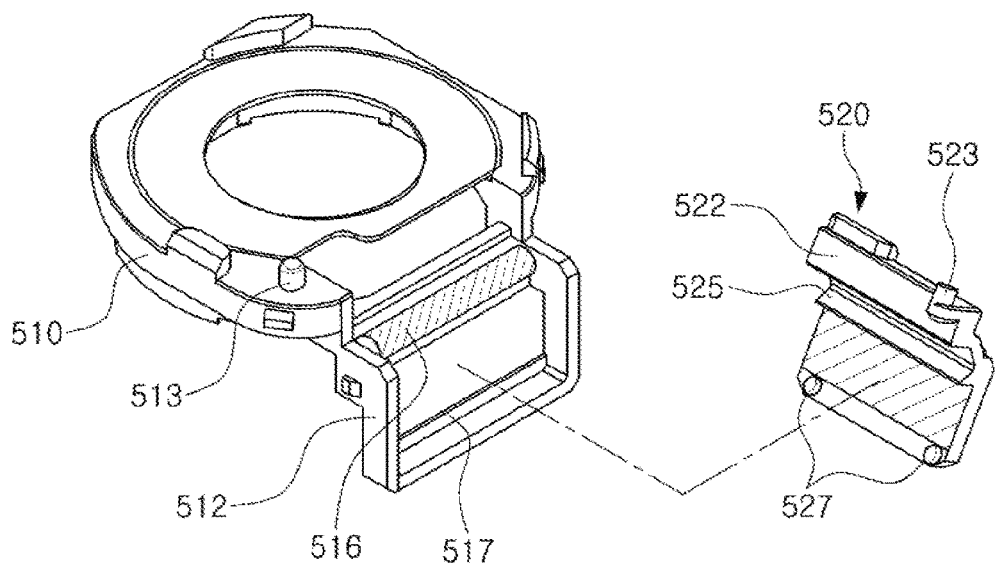
FIG. 9 is an exploded perspective view illustrating a base and a magnet portion of the stop module, according to an embodiment.
Figure 10A:
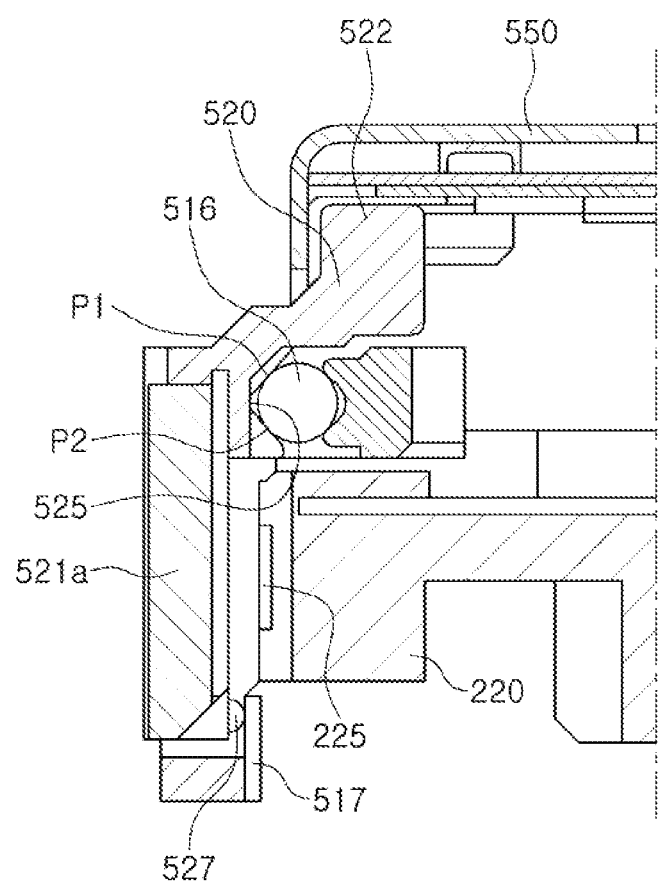
FIGS. 10A and 10B are side views illustrating the stop module, according to embodiments.
Figure 10B:
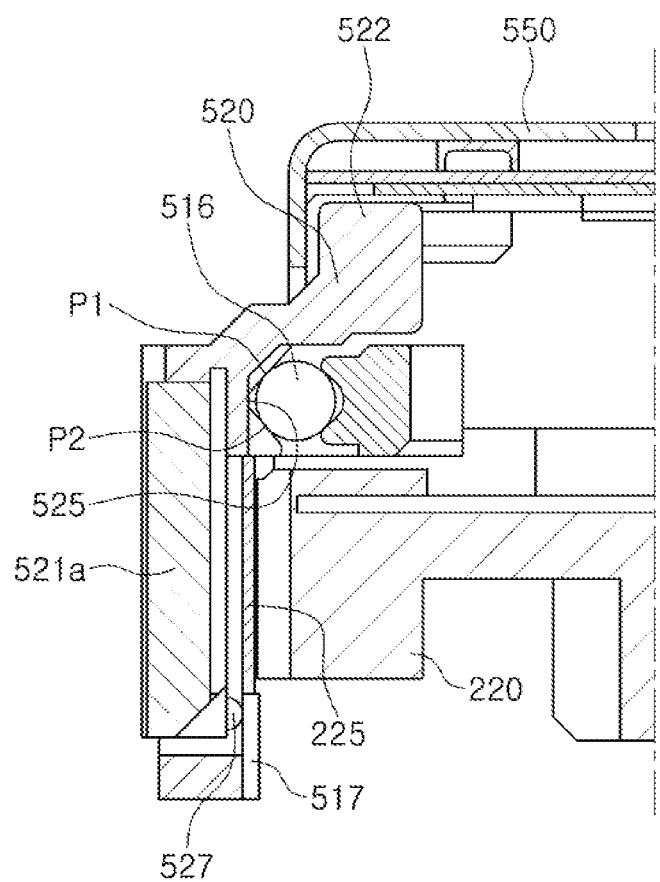

FIG. 4 is an exploded perspective view illustrating the stop module 500, according to an embodiment. FIG. 5 is a plan view illustrating a first plate 530 included in the stop module 500, and FIG. 6 is a plan view illustrating a second plate 540 included in the stop module 500. In addition, FIGS. 7A and 7B are plan views of the stop module 500 illustrating shapes in which a diameter of an incident hole to which light is incident is changed. FIG. 8 is a perspective view illustrating the stop module 500, according to an embodiment. FIG. 9 is an exploded perspective view illustrating a base 510 and a magnet portion 520 of the stop module 500, according to an embodiment. FIGS. 10A and 10B are side views illustrating the stop module 500, according to an embodiments.

The stop module 500 may be coupled to the lens module 200, and may selectively change an amount of light incident to the lens module 200.

Since the stop module 500 may allow a relatively small amount of light to be incident to the lens module 200 in a high illumination environment, and may allow a relatively large amount of light to be incident to the lens module 200 in a low illumination environment, the stop module 500 may constantly maintain quality of an image even in various illumination conditions.

The stop module 500 may be coupled to the lens module 200 and may be movable together with the lens module 200 in the direction of the optical axis, the first direction, and the second direction. That is, at the time of focus adjustment and shake correction, the lens module 200 and the stop module 500 may be moved together such that a distance therebetween is not changed.

Referring to FIG. 4, the stop module 500 may include the base 510, the first plate 530, the second plate 540, and a stop driving part (the magnet portion 520 and a coil 521b). In addition, the stop module 500 may include a cover 550 that covers the base 510, the first plate 530 and the second plate 540, and may include a through-hole 551 through which the light is incident.

Referring to FIGS. 5 and 6, the first plate 530 may include a first through-hole 531 and the second plate 540 may include a second through-hole 541. In addition, since the first plate 530 and the second plate 540 are slid in a state in which they are in contact with each other, the first plate 530 and the second plate 540 may be subjected to antistatic treatment so as not to generate frictional electricity.

In addition, the first plate 530 may include a first guide hole 533 and a third guide hole 535, and the second plate 540 may include a second guide hole 543 and a fourth guide hole 545.

The first guide hole 533 and the second guide hole 543 may be formed to be round, while the third guide hole 535 and the fourth guide hole 545 may be formed to be inclined in respective directions with respect to a lengthwise direction. In addition, the inclined directions of the third guide hole 535 and the fourth guide hole 545 may be opposite to each other.

The first through-hole 531 may have a shape in which through-holes 531a and 531b having different diameters are connected to each other. Similarly, the second through-hole 541 may have a shape in which through holes 541a and 541b having different diameters are connected to each other. In the first through-hole 531, the through-hole 531a having a relatively large diameter and the through-hole 531b having a relatively small diameter may be connected to each other. In the second through-hole 541, the through-hole 541a having a relatively large diameter and the through-hole 541b having a relatively small diameter may be connected to each other. As an example, the first through-hole 531 and the second through-hole may generally have a shape of a gourd bottle (or a roly poly), and the through-holes 531a, 531b, 541a, and 541b may have a round shape or a polygonal shape.

In addition, the shapes of the first through-hole 531 and the second through-hole 541 may be opposite to each other. That is, the first plate 530 and the second plate 540 may rotate about a first protrusion or post 513 (FIG. 4) as a center axis in a state in which both the first guide hole 533 and the second guide hole 543 are inserted into the first protrusion 513. In consideration of this, the first through-hole 531 and the second through-hole 541 may have a shape in which they are approximately symmetrical with each other in a circumferential direction.

The first plate 530 and the second plate 540 may be coupled to the base 510 so as to be partially overlapped with each other in the direction of the optical axis, and may be respectively movable by the stop driving part (the magnet portion 520 and the coil 521b). As an example, the first plate 530 and the second plate 540 may be rotatably movable in directions opposite to each other.

In addition, portions of the first through-hole 531 and the second through-hole 541 may be overlapped with each other in the direction of the optical axis. More specifically, the portions of the first through-hole 531 and the second through-hole 541 may be overlapped with each other in the direction of the optical axis, such that an incident hole through which light passes may be formed.

In addition, the portions of the first through-hole 531 and the second through-hole 541 are overlapped with each other in the direction of the optical axis, such that incident holes having different diameters may be formed. As an example, the portions of the first through-hole 531 and the second through-hole 541 are overlapped with each other, such that an incident hole having a relative large diameter is formed, and the portions of the first through-hole 531 and the second through-hole 541 are overlapped with each other, such that an incident hole having a relative small diameter is formed (the incident hole may have a round shape or a polygonal shape depending on the shapes of the first through-hole 531 and the second hole 541).

Therefore, depending on an environment in which an image is captured, light may be incident through any one of the incident holes.

Referring to FIG. 7A, the first plate 530 and the second plate 540 may be rotatably moved about the first protrusion 513 as an axis by the stop driving part (the magnet portion 520 and the coil 521b), and the portions of the first through-hole 531 and the second through-hole 541 may be overlapped with each other such that an incident hole having the relatively large diameter may be formed.

Referring to FIG. 7B, the first plate 530 and the second plate 540 may be rotatably moved about the first protrusion 513 as the axis by the stop driving part, and portions of the first through-hole 531 and the second through-hole 541 may be overlapped with each other such that an incident hole having the relatively small diameter may be formed.

Referring to FIGS. 8, 9, 10A and 10B, the stop driving portion (the magnet portion 520 and the coil 521b) may include the magnet portion 520 disposed on the base 510 to be movable along one axis, and the coil 521b fixed to the housing 110 to face the magnet portion 520.

The coil 521b may be disposed on the substrate 900 and the substrate 900 may be fixed to the housing 110. The substrate 900 may be electrically connected to the printed circuit board 600 (FIG. 1) attached to the bottom of the camera module 1000.

The magnet portion 520 may be a moving member that moves together with the base 510 in the direction of the optical direction, the first direction, and the second direction. The coil 521b may be a fixed member that is fixed to the housing 110.

Since the coil 521b, which provides driving force to the stop module 500, is disposed outside of the stop module 500, that is, on the housing 110 of the camera module 1000, a weight of the stop module 500 may be reduced.

In other words, since the coil 521b is provided as the fixed member, the coil 521b may not be moved at the time of driving autofocusing or hand-shake correction, and accordingly, an increase in the weight of the lens module 200 due to the use of the stop module 500 may be significantly reduced.

In addition, since the coil 521b is disposed on the housing 110, is the fixed member, and is electrically connected to the printed circuit board 600, even in the case in which the lens module 200 and the stop module 500 are moved at the time of performing the autofocusing and the shake correction, the movement of the lens module 200 and the stop module 500 may not have an influence on the coil 521b of the stop driving part. Therefore, deterioration of an autofocusing function may be prevented.

The base 510 may include a protrusion 512 on which the magnet portion 520 is disposed. The protrusion 512 may have a shape in which the protrusion extends in the direction of the optical axis from the base 510.

The magnet portion 520 may include a magnet 521a disposed to face the coil 521b and a magnet holder 522 to which the magnet 521a is attached. The magnet 521a may be disposed to face the coil 521b in a direction perpendicular to the direction of the optical axis.

The magnet portion 520 may be coupled to the protrusion 512 of the base 510. In addition, as shown in FIG. 10A, the holder 220 of the lens module 200 may have a first yoke 225 at a position opposite to the magnet portion 520. The magnet portion 520 may be slid while maintaining a state in which it is closely in contact with the protrusion 512 by attractive force between the first yoke 225 and the magnet 521a.

Referring to FIG. 10B, the first yoke 225 may also be provided on the base 510. For example, the first yoke 225 may be provided on the base 510 or the protrusion 512 protruding from the base 510 so as to face the magnet portion 520, and the magnet portion 520 may be supported to be closely in contact with the protrusion 512 by attractive force between the magnet 521a included in the magnet portion 520 and the first yoke 225.

In addition, the magnet portion 520 may move in the direction perpendicular to the direction of the optical axis, and may form one of the incident holes having different sizes by the movement of the first and second plates 530 and 540. As a result, when the magnet portion 520 moves to an end portion of one side of the protrusion 512 in the direction perpendicular to the direction of the optical axis, one of the incident holes of the large size or the small size may be formed, and a state in which the magnet portion 520 is fixed to the end portion of the one side of the protrusion 512 needs to be maintained.

As a result, the state in which the magnet portion 520 is fixed to the end portion of the one side of the protrusion 512 may be maintained by implementing a positional relationship between the first yoke and the magnet according FIGS. 12A through 12D.

Figure 12A:
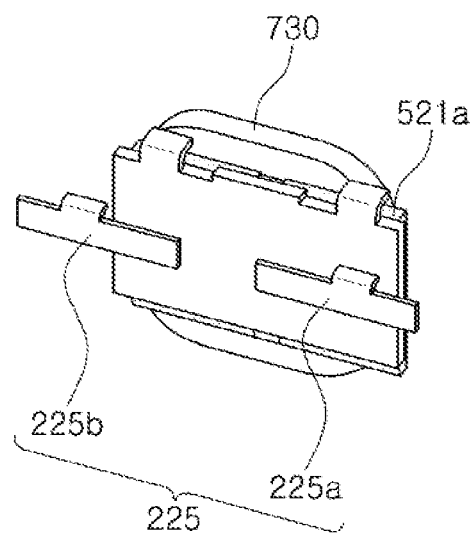
FIGS. 12A through 12D are reference views that variously illustrate a positional relationship between a first yoke and a magnet, according to an embodiments.

Referring to FIG. 12A, the first yoke 225 may include two first yokes 225a and 225b disposed on opposite sides of the protrusion 512 in a direction in which the magnet portion 520 moves. In addition, the magnet 521a may be positioned at the center of the first yoke 225 (e.g., a central position between the first yokes 225a and 225b) before the driving force is applied to the magnet portion 520. In addition, when power is applied to the coil 521b, the magnet portion 520 may move to the end portion of one side of the protrusion 512 by an interaction with the magnet 521a. In the above-mentioned state, since the magnet portion 520 is closer to one of the two first yokes 225a and 225b, attractive force acting between the magnet portion 520 and the one of the first yokes 225a and 225b positioned adjacent to the end portion of the one side of the protrusion 512 is greater than attractive force acting between the magnet portion 520 and the other of the first yokes 225a and 225b positioned adjacent to an end portion of the other side of the protrusion 512, such that the state in which the magnet portion 520 is fixed to the end portion of the one side of the protrusion 512 may be maintained even, in a case in which the supply of the power to the coil 521b is stopped.

Figure 12B:
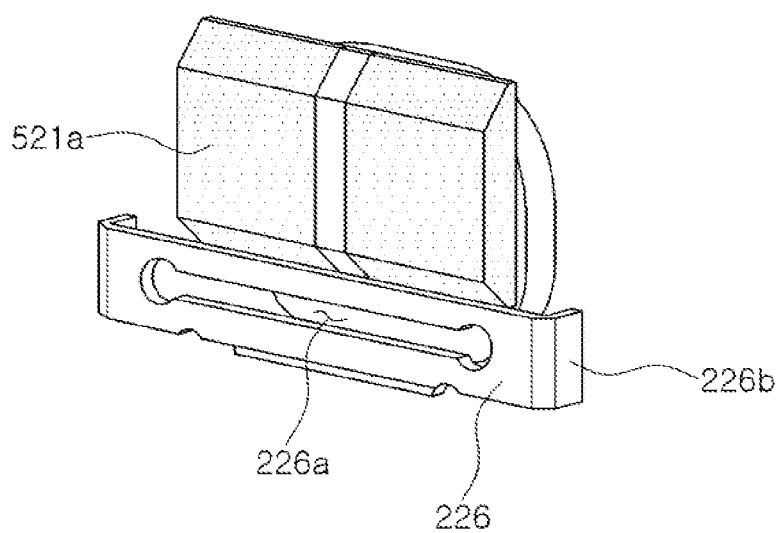

In addition, referring to FIG. 12B, a first yoke 226, according to an embodiment, may have a hole 226a at the center portion thereof. Accordingly, both end portions of the first yoke 226 may have a larger area than the center portion. In addition, the magnet 521a may be disposed to be positioned at the center of the first yoke 226 before the driving force is applied to the magnet portion 520. In addition, when the power is supplied to the coil 521b, the magnet portion 520 may move to the end portion of one side of the protrusion 512 by the interaction with the magnet 521a. In the above-mentioned state, since the magnet portion 520 is closer to one of the first yoke 226, attractive force acting between the magnet portion 520 and an end portion of the one side of the first yoke 226 is greater than attractive force acting between the magnet portion 520 and an end portion of the other side of the first yoke 226, such that the state in which the magnet portion 520 is fixed to the end portion of the one side of the protrusion 512 may be maintained even in a case in which the supply of the power to the coil 521b is stopped.

As illustrated in FIG. 12B, the first yoke 226 may have hinged parts 22gb which are bent in a direction of the magnet 521a and face both end portion surfaces of the magnet 521a at both end portions thereof. In this structure, the magnet portion 520 may more easily fixed to the end portion of the one side or the other side of the protrusion 512.

Figure 12C:
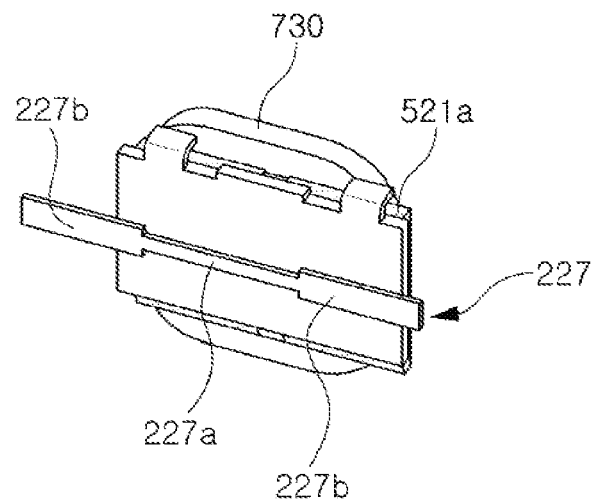

In addition, referring to FIG. 12C, a first yoke 227, according to an embodiment, may have a central portion 227a having a width that is less than a width of both end portions 227b thereof. Accordingly, both end portions 227b of the first yoke 227 may have a larger area than the center portion. In addition, the magnet 521a may be disposed to be positioned at the center of the first yoke 227 before the driving force is applied to the magnet portion 520. In addition, when the power is supplied to the coil 521b, the magnet portion 520 may move to the end portion of one side of the protrusion 512 by the interaction with the magnet 521a. In the above-mentioned state, since the magnet portion 520 is closer to any one of sides of the first yokes 227, attractive force acting between the magnet portion 520 and an end portion of the one side of the first yoke 227 is greater than attractive force acting between the magnet portion 520 and an end portion of the other side of the first yoke 227, such that the state in which the magnet portion 520 is fixed to the end portion of the one side of the protrusion 512 may be maintained even in a case in which the supply of the power to the coil 521b is stopped.

Figure 12D:
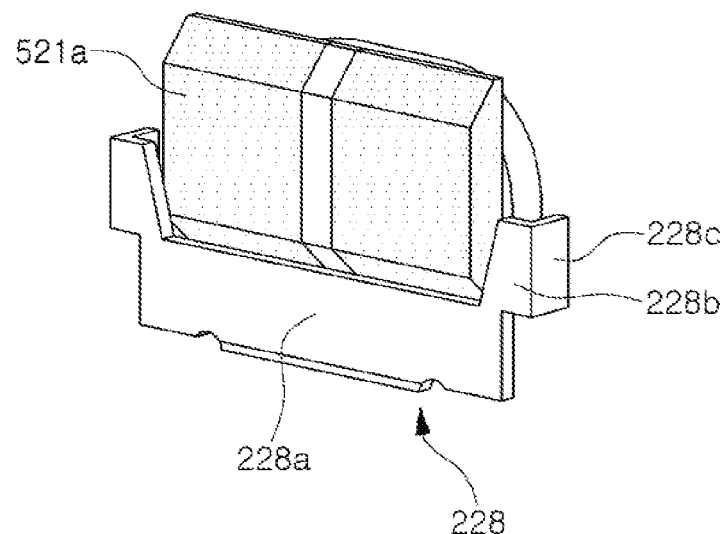

Referring to FIG. 12D, a first yoke 228, according to an embodiment, may have a central portion 228a and extension parts 228b extending in the direction of the optical axis at both end portions thereof, and may have hinged parts 225c that are bent in the direction of the magnet 521a from the extension parts 225b and face both end portion surfaces of the magnet 521a. In addition, the magnet 521a may be positioned at the center of the first yoke 225 before the driving force is applied to the magnet portion 520. In addition, when the power is supplied to the coil 521b, the magnet portion 520 may move to the end portion of one side of the protrusion 512 by the interaction with the magnet 521a. In the above-mentioned state, since the magnet portion 520 is closer to one of side of the first yokes 228, attractive force acting between the magnet portion 520 and the hinged part 225c of an end portion of the one side of the first yoke 228 is greater than attractive force acting between the magnet portion 520 and the hinged part 225c of an end portion of the other side of the first yoke 228, such that the state in which the magnet portion 520 is fixed to the end portion of the one side of the protrusion 512 may be maintained even in a case in which the supply of the power to the coil 521b is stopped.

Figure 12E:
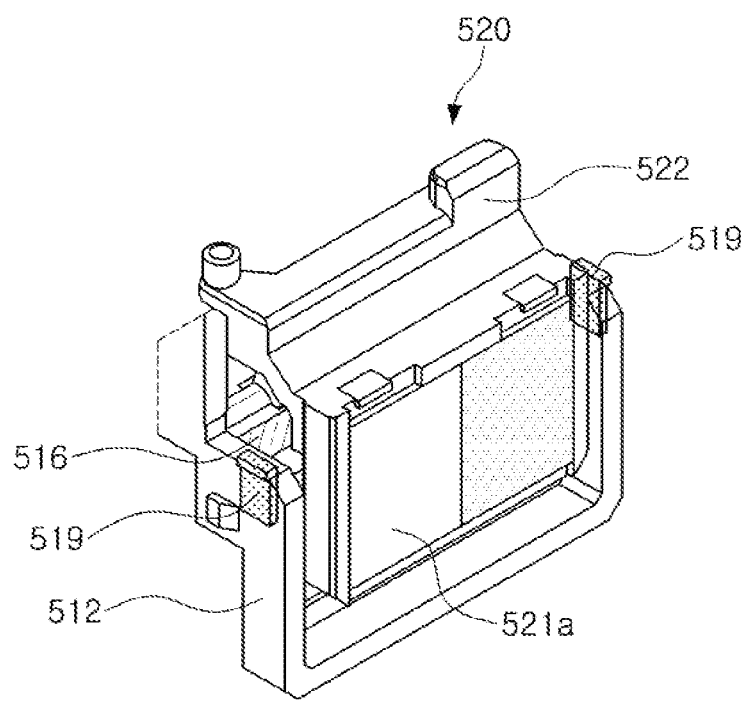
FIG. 12E is a reference view illustrating a positional relationship between a holding yoke and a magnet, according to an embodiment.

In addition, referring to FIG. 12E, the stop module 500, according to an embodiment, may have holding yokes 519 fixing the magnet portion 520 to the end portion of one side or the other side of the protrusion 512, separately from the first yoke 225, 226, 227, or 228, or so as to extend from the first yoke 225 or separately in a case in which the first yoke 225 is provided on the base 510 or the protrusion 512. The holding yokes 519 may be provided on the protrusion 512 facing both end portions of the magnet 521a included in the magnet portion 520. In more detail, the holding yokes 519 may be provided on surfaces of the protrusion 512 facing both end portion surfaces of the magnet 521a.

In addition, the base 510 may include a rod member 516 supporting the magnet portion 520 to facilitate a sliding movement of the magnet portion 520. Further, the magnet portion 520 may include an insertion groove 525 in which the rod member 516 is inserted.

The rod member 516 may have a round rod shape to facilitate the sliding movement of the magnet portion 520, and the insertion groove 525 may be configured in a cylinder shape having a diameter smaller than the rod member 516 so that the insertion groove 525 is in line contact with the rod member 516 to reduce frictional force, or in a polygonal shape.

For example, as illustrated in FIGS. 10A and 10B, the rod member 516 and the insertion groove 525 may be configured to be in line contact with each other to along the sliding movement direction at two points P1 and P2. At least two insertion grooves 525 which are spaced apart from each other by a predetermined distance in the length direction of the rod member 516 may be provided. In this case, the rod member 516 may slide while the insertion grooves 525 and the rod member 516 maintain contact with each other in a nearly point contact form.

In addition, in a case in which only the rod member 516 is in contact with the magnet portion 520, since the fixing of the magnet portion 520 is unstable and a tilting (inclination) may occur, a supporting part may be additionally disposed at a portion spaced from the rod member 516.

That is, as illustrated in FIGS. 10A and 10B, a guide plate 517 may be provided on the end portion of the protrusion 512, and may extend substantially parallel to the rod member 516, and a portion of the magnet holder 522 of the magnet portion 520 facing the guide plate 517 may include a guide boss 527 configured to be in slid contact with the guide plate 517.

At least two guide bosses 527 may be provided in the length direction of the rod member 516 to stably support the magnet portion 520. In addition, an end portion of the guide boss 527 may have a round shape and may be in point contact with the magnet holder 522. For example, as illustrated in FIGS. 9, 10A and 10B, two guide bosses 527 may be disposed spaced apart from each other by a predetermined distance.

Alternatively, only one guide boss 527 may be provided, and in this case, the guide boss 527 may be provided to an appropriately central portion in the length direction of the rod member 516.

Figure 11:
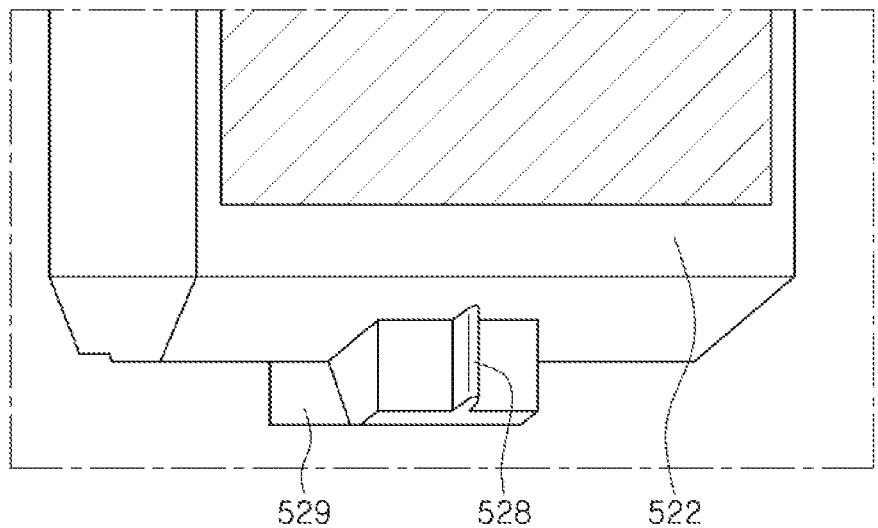
FIG. 11 is a perspective view illustrating a magnet portion, according to an embodiment.

In addition, in the case in which only one guide boss is provided, for example, as illustrated in FIG. 11, a separate additional member 529 may be formed on the magnet holder 522 to install a guide boss 528. The guide boss 528 may be formed in a shape extended in a direction perpendicular to the length direction of the rod member 516 to stably support the magnet holder 522, and may be in line contact with the magnet holder 522.

When the power is applied to the coil 521b, the magnet portion 520 may move along a direction in which the rod member 516 extends, by an electromagnetic influence between the magnet 521a and the coil 521b.

The magnet portion 520 may move along one axis in a state in which it is supported by the rod member 516 and the guide bosses 527 and 528.

As shown in FIG. 9, the base 510 may include the first protrusion 513 which simultaneously penetrates through the first guide hole 533 of the first plate 530 and the second guide hole 543 of the second plate 540. In addition, the first plate 530 and the second plate 540 may rotate about the first protrusion 513 as an axis.

In addition, the magnet holder 522 may be provided with a second protrusion or second post 523 penetrating through the first plate 530 and the second plate 540.

The second protrusion 523 may pass through the third guide hole 535 of the first plate 530 and the fourth guide hole 545 of the second plate 540.

The third guide hole 535 and the fourth guide hole 545 may be inclined with respect to the movement direction of the magnet portion 520, and the third guide hole 535 and the fourth guide hole 545 may be inclined in directions opposite to each other.

Therefore, when the magnet portion 520 moves along one axis, the second protrusion 523 may move within the third guide hole 535 and the fourth guide hole 545, and the first plate 530 and the second plate 540 may move toward or away from the magnet portion 520 based on the movement of the second protrusion 523 (see FIGS. 7A and 7B).

As set forth above, a camera module according to this disclosure, an amount of incident light may be selectively changed through a stop module, deterioration of performance of an autofocusing function may be prevented even in a case in which the stop module is mounted in the camera module, and an increase in a weight of the camera module due to the inclusion of the stop module may be significantly reduced.

As set forth above, according to the disclosed embodiments, the camera module may improve autofocusing and optical image stabilizer functions by significantly reducing an increase in a weight of a driving part even in the case in which a stop module is mounted in the camera module.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a housing accommodating a lens module;
a stop module coupled to a top of the lens module and comprising
a base comprising a protrusion fixed to the top of the lens module and extending in a direction of an optical axis of the camera module along an outer side of the lens module,
plates disposed on the base and having incident holes configured to change an amount of light incident to the lens module, and
a magnet portion movable in a direction perpendicular to the direction of the optical axis with respect to the protrusion and comprising a driving magnet; and
a coil disposed in the housing and configured to interact with the driving magnet to drive the stop module.

2. The camera module of claim 1, wherein
the lens module comprises a yoke disposed on a surface facing the magnet portion, and
the magnet portion is supported to be in contact with the protrusion by attractive force between the driving magnet and the yoke.

3. The camera module of claim 2, wherein the yoke comprises two yoke portions spaced apart from each other along a movement direction of the magnet portion.

4. The camera module of claim 2, wherein
the yoke has a width that is greater than a width of the magnet in the direction of the optical axis, and
a width of end portions of the yoke is greater than a width of a middle portion of the yoke.

5. The camera module of claim 4, wherein the yoke has a hole formed in the middle portion.

6. The camera module of claim 2, wherein the yoke comprises hinged parts that are bent in a direction toward the magnet and face surfaces of end portions of the magnet.

7. The camera module of claim 1, wherein
the protrusion comprises a rod member extending in the direction perpendicular to the direction of the optical axis, and
the magnet portion further comprises an insertion groove into which the rod member is inserted.

8. The camera module of claim 1, wherein
a lower end portion of the magnet portion includes a guide boss extending toward the protrusion, and
a guide plate is disposed on a lower end portion of the protrusion and is configured to enable the guide boss to slide.

9. The camera module of claim 1, wherein
the base further comprises a first protrusion protruding in the direction of the optical axis, and
the plates comprise first guide holes into which the first protrusion is inserted so that the plates are rotatable about the first protrusion as an axis.

10. The camera module of claim 9, wherein
the magnet portion further comprises a second protrusion extending in the direction of the optical axis,
the plates further comprise second guide holes having a hole shape elongated in one direction, and
the second protrusion is inserted into the second guide holes.

11. The camera module of claim 10, wherein the second guide holes are inclined with respect to a movement direction of the driving part.

12. The camera module of claim 11, wherein
the plates comprise two plates, and
the second guide holes comprise two second guide holes respectively disposed in the two plates and inclined with respect to each other.

13. The camera module of claim 1, further comprising a carrier accommodating the lens module so that the lens module is movable in a first direction perpendicular to the direction of the optical axis, the direction of the optical axis, and a second direction perpendicular to the first direction,
wherein the carrier is accommodated in the housing and is movable in the direction of the optical axis.

14. The camera module of claim 13, wherein
the housing has an approximately square box shape,
two driving coils configured to provide a driving force to move the lens module in the first direction and the second direction are disposed on first and second surfaces of the housing that extend parallel to the direction of the optical axis,
a driving coil configured to provide a driving force to move the carrier in the direction of the optical axis is disposed on a third surface of the housing that extends parallel to the direction of the optical axis, and
a coil configured to drive the plates is disposed on a fourth surface of the housing that extends parallel to the direction of the optical axis.

15. The camera module of claim 1, wherein the driving magnet and the coil face each other in another direction perpendicular to the direction of the optical axis.

16. The camera module of claim 1, wherein
the base further comprises a yoke disposed on a surface facing the magnet portion, and
the magnet portion is supported in contact with the protrusion by attractive force between the driving magnet and the yoke.

17. A camera module, comprising:
a housing accommodating a lens module;
a stop module coupled to a top of the lens module and comprising
a base,
a protrusion attached to the base,
plates disposed on the base and having incident holes configured to control an amount of light incident to the lens module, and
a magnet portion supported by the protrusion and configured to move in a direction perpendicular to a direction of an optical axis of the camera module in order to move the plates to arrange the incident holes; and
a coil disposed in the housing and configured to interact with the magnet portion to move the magnet portion in the direction perpendicular to the direction of the optical axis.

18. The camera module of claim 17, wherein the lens module comprises a yoke, and the magnet portion is supported in contact with the protrusion by attractive force between the magnet portion and the yoke.

19. The camera module of claim 17, wherein
the plates comprises first guide holes and second guide holes,
the base comprises a first post received in the first guide holes,
the magnet portion comprises a second post received in the second guide holes, and
movement of the magnet portion in the direction perpendicular to the direction of the optical axis causes the second post to move within the second guide holes and causes the plates to rotate about the first post.

20. The camera module of claim 17, wherein the protrusion comprises a rod member extending in the direction perpendicular to the direction of the optical axis, and the magnet portion is configured to slide along the rod member.

* * * * *